United States Patent [19]

Ohta et al.

[11] Patent Number: 5,065,792
[45] Date of Patent: Nov. 19, 1991

[54] COUPLING MECHANISMS FOR ROTARY FLUID CYLINDERS

[75] Inventors: Koziro Ohta, Fukuyama; Yoshihito Kurogi, Hiroshima; Yasuo Suzuki, Fukuyama, all of Japan

[73] Assignee: Kitagawa Iron Works Co., Ltd., Hiroshima, Japan

[21] Appl. No.: 595,264

[22] Filed: Oct. 9, 1990

[51] Int. Cl.⁵ .............................................. B23B 31/30
[52] U.S. Cl. ..................................... 137/580; 137/581
[58] Field of Search ............ 137/580, 581, 313, 355.26, 137/355.27

[56] References Cited

U.S. PATENT DOCUMENTS

| | | | |
|---|---|---|---|
| 2,357,381 | 9/1944 | Carlson | 137/580 X |
| 2,831,651 | 4/1958 | Hutchings | 137/580 X |
| 2,913,002 | 11/1959 | Janas | 137/580 |
| 3,381,704 | 5/1968 | Richardson | 137/580 X |
| 4,168,654 | 9/1979 | Wilson et al. | 1347/580 X |
| 4,749,335 | 6/1988 | Brandt et al. | 137/580 X |
| 4,790,699 | 12/1988 | Ringel | 137/580 X |
| 4,848,400 | 7/1989 | Grant et al. | 137/580 |

FOREIGN PATENT DOCUMENTS 2344190  3/1974  Fed. Rep. of Germany ...... 137/580

Primary Examiner—John Rivell
Attorney, Agent, or Firm—Frishauf, Holtz, Goodman & Woodward

[57] ABSTRACT

A coupling mechanism for a rotary fluid cylinder which comprises a rotary member and a fluid feeding member concentrically mounted on said rotary member, at least one fluid passage being formed for supplying fluid from the fluid feeding member to the rotary member even while the rotary member is rotating. The coupling mechanism comprises a pair of rolling bearings interposed between the fluid feeding member and the rotary member at the respective extreme ends of the fluid feeding member so as to allow relative rotation of the rotary member with respect to the fluid feeding member. A biasing member for applying a predetermined pre-load to the respective rolling bearing is provided. The applied pre-load acts on the rolling bearings in such a manner that the rolling bearings are biased to move away from each other in their axial direction.

12 Claims, 3 Drawing Sheets

COUPLING MECHANISMS FOR ROTARY FLUID CYLINDERS

BACKGROUND OF THE INVENTION

The present invention relates to a rotary fluid cylinder which is used, for instance, to open and close the jaws of a chuck mounted at the extreme end of a spindle of a machine tool, and more particularly to a coupling mechanism therefor.

In a rotary fluid cylinder, a pair of rolling bearings are inserted between a rotary member and a fixed fluid feeding member which is coaxially mounted on the rotary member to feed the fluid to the rotary member even while the latter is being rotated. The fluid feeding member is liable to swing or vibrate when, for example, the rotary member inevitably makes a run-out (which is caused by a dimensional machining error within a tolerance of respective parts and the deflection thereof due to their weight) while it is rotated for rotation of the chuck. The fixed fluid feeding member is then liable to come into contact with the rotary member when the annular gap defined therebetween is small, which results in seizure of the related parts. Therefore, the above annular gap has been conventionally made sufficiently large to avoid the occurrence of the contact, which is against the recent request to make a machine tool compact. Further, when the annular gap is made larger, the amount of oil leaking through which is increased, which causes increase of heat generation during operation. In order to restrict the amount of oil leaking less than a predetermined amount, it becomes necessary, for instance, to increase the longitudinal length of the annular gap, which is also against the request of making a machine tool compact.

It has therefore been proposed to apply a pre-load to the outer ring of the rolling bearing, as has been disclosed in German Offenlegungsschrift DE 3306571 A1, to restrain the clattering of the rolling bearing so as to decrease a so-called radial-gap which is generally required, when employing the rolling bearing, for allowing the above clattering. The required radial-gap influences the required annular gap between the rotary member and the fluid feeding member. Accordingly, it is true that, with this constitution, the required radial-gap can be decreased and so it theoretically becomes possible to decrease the required annular gap to that extent.

In fact, however, it has not succeeded in attaining the desired results. That is, it was found from our experiments that, although the clatterings of the rolling bearings have actually been restrained, seizure of the related parts has occured when the annular gap is decreased correspondingly to a decrease of the required radial gap, and further, the amount of oil leaking has not been decreased as expected. In other words, we have had to have the sufficiently large annular gap as in conventional cylinders, and the clatterings of the rolling bearings were restrained and the required radial-gap was decreased.

A volumetric relationship of associated elements is represented by the following numerical formulas.

Numerical formula (1)

amount of oil leaking $\propto$ (annular gap)$^3$/longitudinal length thereof

Numerical formula (2)

heat generated by rotation $\propto$

[longitudinal length $\cdot$ (dia. of rotary member)$^3 \cdot$ (revolutional number$^2$)]/annular gap In the above formulas (1) and (2), the symbol "$\propto$" indicates —varies as—.

The above formula (1) says

The amount of oil leaking increases in proportion to the (annular gap)$^3$, but decreases in proportion to the longitudinal length of the annular gap.

The above formula (2) says

The heat generated by rotation increases in proportion to longitudinal length of the annular gap $\times$ (diameter of the rotary member)$^3$ (revolutional number)$^2$, but decreases in proportion to the annular gap.

As is apparent from the above numerical formulas, the longitudinal length of the annular gap must be increased in proportion to the third power of a ratio of change of the annular gap to keep an amount of leaked oil to the predetermined amount while the annular gap is increased. On the other hand, since heat generated during operation is increased in proportion to the longitudinal length of the annular gap and in inverse proportion to the annular gap itself, eventually, heat generation is greatly increased when the amount of leaked oil is kept to the predetermined amount.

SUMMARY OF THE INVENTION

It is therefore an object of the present invention to provide an improved coupling mechanism for a rotary fluid cylinder capable of decreasing a required annular gap for decreasing an amount of oil leaking while still keeping the machine compact, i.e., without elongating the londitudinal length thereof and so on.

For the above purpose, according to the present invention, there is provided a coupling mechanism for a rotary fluid cylinder which comprises a rotary member and a fluid feeding member concentrically mounted on said rotary member, at least one fluid passage being formed for supplying fluid from the fluid feeding member to the rotary member even while said rotary member is rotating, said coupling mechanism comprises a pair of rolling bearings interposed between said fluid feeding member and said rotary member at the respective extreme ends of said fluid feeding member so as to allow relative rotation of the rotary member with respect to the fluid feeding member, and means for applying a predetermined pre-load to the respective rolling bearing, wherein the applied load acts on the rolling bearings in such a manner that the rolling berings are biased to move away from each other.

As the rolling bearings, it is preferable to employ deep-groove ball bearings. Further, the pre-load is to be applied preferably to the outer ring of the rolling bearings by an elastic member inserted between the side surface of the outer ring and an inner surface portion of the fluid feeding member.

By employing the above constitution, we have succeeded in decreasing the required annular gap with correspondingly decreasing the amount of oil leaking without occurance of seizure of the related parts.

That is, when the rotary member rotated by the rotation of a spindle of a machine tool is strictly observed, inevitably arisen is a "run-out", i.e., a phenomenon that the rotary member is rotated in the state that the actual center line of rotation is in misalignment with the configurational center axis thereof due to the radial displacements of the rolling bearings, machining errors and differences in weights of the respective parts. Then, the fluid feeding member which is connected to suitable fluid supply and discharge pipes and so the attitude of which is regulated, is inevitably vibrated, whereby a moment load to incline the rotary member toward the fluid feeding member is applied to the coupling mechanism. The amount of the moment load applied increases with increase in the revolutional number of the rotary member.

When the amount of the moment load is increased, the radial displacements of the bearings are increased, and the relative displacement between the actual center line of rotation and the configulational center axis of the rotary member is increased, so that the annular gap formed between the rotary member and the fluid feeding member is made irregular in the circumferential direction as well as in the axial direction.

This condition will be described in comparison with the prior art with reference to FIG. 3. In FIG. 3, A shows the present invention in which the bearings are forced to move away from each other in their axial direction, and B shows the prior art disclosed in the above mentioned German Offenlegunsschrift in which the bearings are forced to move toward each other.

In the case of the present invention, a force F1 applied to the bearings by a moment load M is represented by the following numerical formula.

$$F1 = M/L1$$

On the other hand, in the case of the prior art, a force F2 applied to the bearings by a moment load M is represented by the following numerical formula.

$$F2 = M/L2$$

Since $L1 > L2$, $F1 < F2$. More specifically, a force applied to the bearings of the present invention is smaller than that applied to the bearings of the prior art.

Next, the influences of the aboves onto the annular gap defined between the rotary member and the fluid feeding member will be described with reference to FIG. 4. When the moment load M is not applied, the inner surface of the fluid feeding member with respect to the rotary member is shown by a state a and the annular gap at the time is represented by T.

On the other hand, when the rotary member is rotated and the moment load M is applied, the annular gap of the present invention becomes different from that of the prior art. That is, in the former case, the inner surface of the fluid feeding member is shown by a state of b and a minimum gap is made to E1, whereas, in the latter case, the inner surface of the fluid feeding member is shown by a state c and a minimum gap is made to E2.

As apparent from the above, the minimum gap of the annular gap in the case embodying the present invention is larger at $\Delta E$ than that of the prior art, and thus the annular gap of the present invention can be made smaller to that extent than that of the prior art. Further, this means that the amount of the eccentric displacement of the annular gap with respect to the rotary member is made smaller than the prior art.

Thus, when the annular gap is made smaller and the amount of oil leaking is kept to a predetermined level, the longitudinal length thereof can be made sufficiently small, and heat eventually generated by rotation is greatly reduced as apparent from the aforementioned numerical formulas. Further, since the fluid feeding member of a short length suffices, a machine tool can be made compact. Moreover, as known in the art, when the annular gap is displaced to its maximum eccentric state, the amount of fluid passing through the annular gap becomes 2.5 times larger than that when the annular gap is in the concentric state. Accordingly, the smaller amount of fluid is leaked when the annular gap is closer to the concentric state.

EMBODIMENTS OF THE INVENTION

Figure 1:
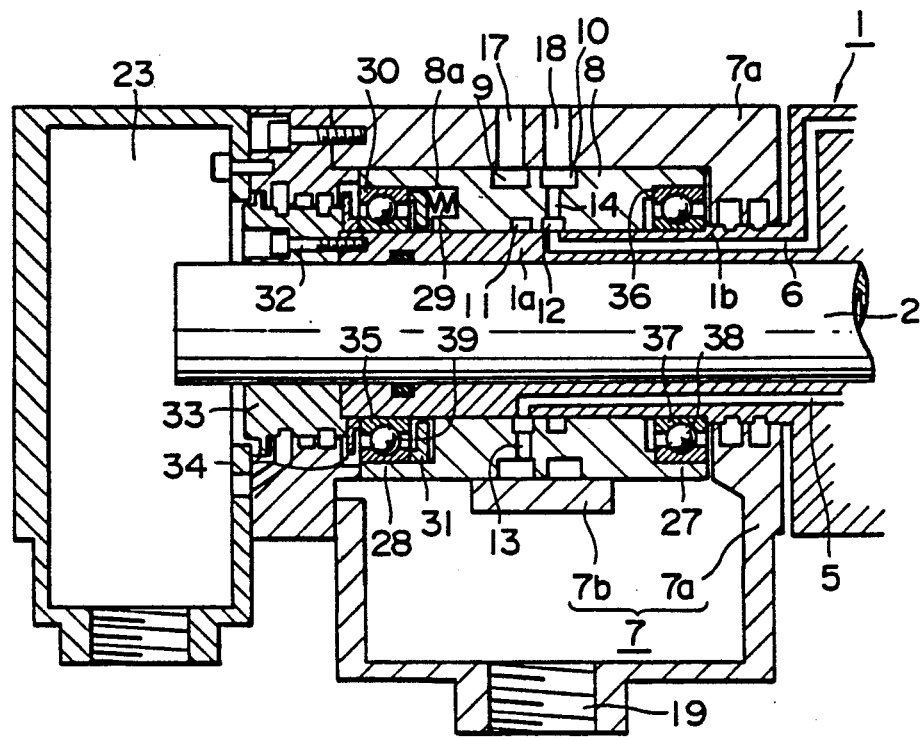
FIG. 1 is a partial cross sectional view of a coupling mechanism for a fluid rotary cylinder embodying the present invention.

FIG. 1 illustrates a coupling mechanism for a rotary fluid cylinder embodying the present invention, wherein 1 designates a rotary member coaxially coupled to a spindle or the like of a lathe and having a rotary shaft 1a.

A piston member 2 is coaxially provided at the center of the rotary member 1 in such a manner that it is free to slide and displace along the center axis c1 of the rotary member 1. Respective independent fluid chambers, not shown, are defined at the left end in FIG. 1 of the rotary member 1, and respective oil paths 5, 6 formed in the rotary shaft 1a communicate with the respective fluid chambers.

On the other hand, a cylindrical fluid supply member 7 to which operating fluid is supplied from the outside is mounted over the rotary shaft 1a via a sleeve 8 as an integral part of the fluid supply member 7. Designated at 9 and 10 are ring-shaped oil grooves defined on the outer circumference of the sleeve 8, and designated at 11 and 12 are similar ring-shaped oil grooves defined on the inner circumference thereof. The oil grooves 9, 10 communicate with the oil grooves 11, 12 through respective oil paths 13, 14 extended in the radial directions. Although the outer circumference of the sleeve 8 is surrounded by the main body 7a of the supply member 7, the lower half thereof is partially surrounded by the partition member 7b thereby to facilitate the recovery of leaked oil.

Deep-groove ball bearings 27, 28 are interposed between the respective ends of the sleeve 8 and the shaft 1a, and the above fluid supply member 7 mounted through these deep-groove ball bearings 15, 16 enables the shaft 1a to be free to rotate and displace. Designated at 17 and 18 are fluid supply/discharge ports, designated at 19 is a leaked oil discharge port, designated at 33 is an oil thrower fixed to the shaft 1a by bolts, and designated at 23 is a rear cover.

A stepped portion 1b is defined on the shaft 1a of the rotary member 1 to form a small-diameter portion.

On the other hand, the sleeve 8 has cutouts defined on the insides of the opposite extreme ends thereof, a hole 8a is formed on the bottom of one of the cutouts, deep-groove ball bearings 27, 28 are inserted into the respective cutouts, a spring 29 is loosely inserted into the hole 8a, and a retainer 31 held in abutment against the outer ring 30 of the bearing 28 is interposed between the spring 29 and the bearing 28 in such a manner that the retainer 31 can be displaced in the direction along the shaft 1a.

The two bearings 27, 28 are inserted over the above small-diameter portion: one of them, the bearing 27 is locked to the above-stepped portion 1b; and the other of them, the bearing 28 is mounted in such a manner that the inner ring 35 thereof is held in abutment against a fringer 34 and supported thereby. The rear portion of the fringer 34 is supported by the oil thrower 33 fixed to the end of the small-diameter portion by bolts 32, so that the displacement of the bearing 28 in the left direction in FIG. 1 is regulated. In the state that the bearing 28 is positioned at the predetermined location by the fringer 34, the spring 29 is compressed to a suitable length to apply a predetermined amount of extending force, and the sleeve 8 can make a predetermined amount of slide in the direction of the center axis thereof with respect to the main body 7a and the partition member 7b of the fluid supply member 7.

Figure 2:
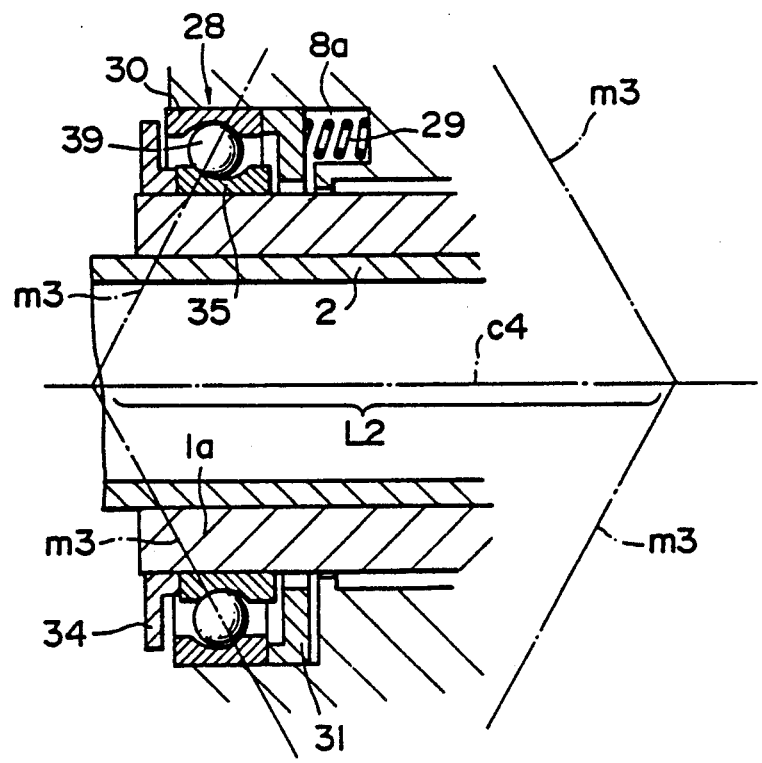
FIG. 2 is a partial enlarged view of the coupling mechanism shown in FIG. 1.
Figure 3:
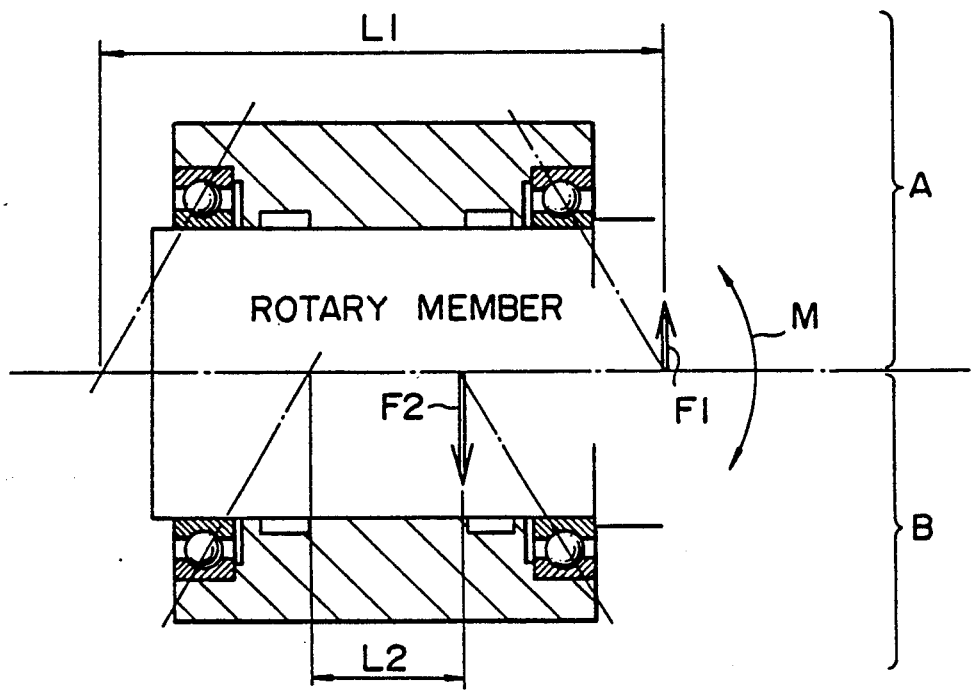
FIG. 3 is a diagram explaining the effects of the moment load.
Figure 4:
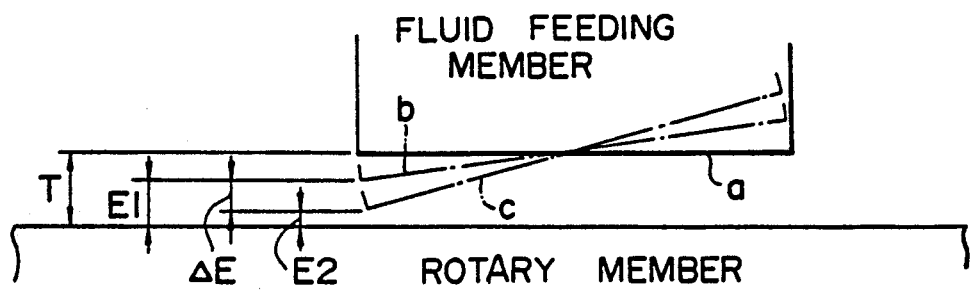
FIG. 4 is a diagram explaining the changes in the annular gap.

With this arrangement, the extending force of the spring 29 presses the outer ring 30 of the deep-groove bearing 28 through the retainer 31 in the left direction against the inner ring 35 thereof whose displacement in the left direction is regulated. Whereas, the sleeve 8 is pressed in the right direction along the shaft 1a, and the outer ring 36 of the other bearing 27 is pressed in the right direction against the inner ring 37 thereof whose displacement in the right direction is regulated by the reaction caused by the above pressing action. Thus, the relationship between the outer and inner rings, 36, 37, and 30, 35 of the respective deep-groove ball bearings 27, 28 and rolling members 38, 39 is arranged as shown in FIG. 2, so that the distance L2 between the cross points of the contact lines m3 and center axis of rotation c4 thereof is increased. More specifically, the deep-groove bearings 27, 28 are biased to move away from each other by a predetermined pre-load applied to the bearings 27, 28 by the spring 29.

Operation of the above cylinder will be described below. When pressurized oil is suitably supplied from a not-shown external operation fluid supply/discharge unit to any of the fluid chambers through the fluid supply/discharge port 17 or 18, the oil grooves 9 and 11, or 10 and 12 of the sleeve, the oil paths 13 or 14 and the oil path 5 or 6, and the like, the piston member 2 is slidingly displaced in a predetermined direction along the center axis of the rotary member 1, whereby the jaws of the chuck, not shown, are suitably opened and closed. Further, pressurized oil continuously fed to the fluid chamber after the jaws have gripped enables the jaws to grip a workpiece by a predetermined force even if the chuck rotates at a high speed.

Figure 5:
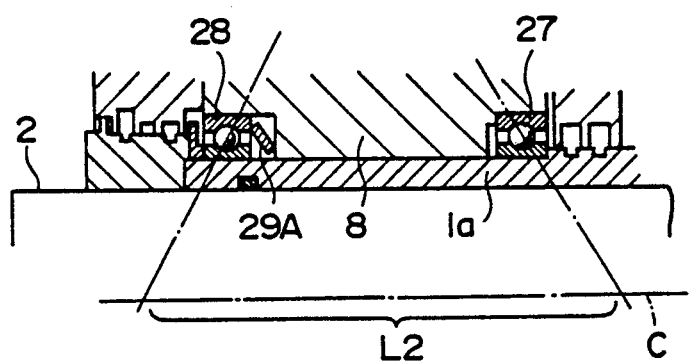
FIGS. 5 and 6 are partial cross sectional views showing modified embodiments.
Figure 6:
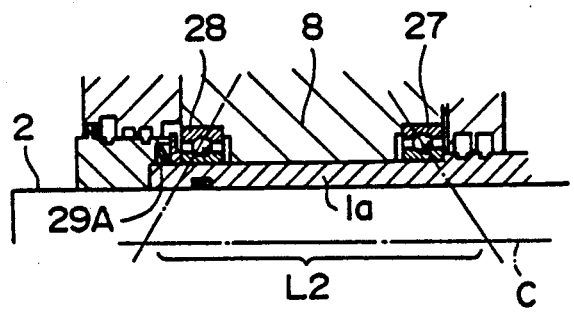

FIGS. 5 and 6 show modified embodiments of the present invention which employs a cup spring 29A as the pre-loading member, wherein the relative arrangement of the deep-groove ball bearings 27, 28, the sleeve 8 and the cup spring 29A is changed thereby to increase the distance L2 between the cross points of contact lines m3 and center axes C of rotation.

As described above, according to the rotary fluid cylinder embodying the present invention, the annular gap defined between the sleeve and the shaft can be made smaller than that of the prior art so that heat generated by rotation can be greatly reduced while keeping the amount of oil leaking to a conventional level. Further, since the longitudinal length of the annular gap, i.e., the axial length of the sleeve can be shortened, whereby a machine tool can be made compact.

Moreover, the deep-groove ball bearings are employed as the rolling bearings, the bearings are less expensive and the useful life thereof can be prolonged because they can be used twice by reversing the front and back sides thereof.

We claim:

1. A coupling mechanism for a rotary fluid cylinder which comprises a rotary member; a fluid feeding member concentrically mounted on said rotary member; and at least one fluid passage means for supplying fluid from said fluid feeding member to said rotary member even while said rotary member is rotating, said coupling mechanism comprising:

a pair of ball bearings interposed between said fluid feeding member and said rotary member at respective extreme end portions of said fluid feeding member so as to allow relative rotation of said rotary member with respect to said fluid feeding member, said ball bearings each having an outer ring; and means for applying a predetermined pre-load to said respective ball bearings in such a manner that said ball bearings are biased so as to move away from each other, said pre-load being applied to said outer ring of said respective ball bearings.

2. The coupling mechanism of claim 1, wherein said ball bearings each comprise a deep-groove ball bearing.

3. The coupling mechanism of claim 1, wherein said fluid feeding member has an inner surface portion, and said pre-load applying means comprises an elastic member arranged between side surfaces of said outer rings and inner surface portions of said fluid feeding member.

4. The coupling mechanism of claim 3, wherein said pre-load applying means comprises a pair of elastic members respectively arranged between a side surface of a respective outer ring and an inner surface portion of said fluid feeding member.

5. The coupling mechanism of claim 4, wherein said elastic members comprises resilient spring members.

6. The coupling mechanism of claim 1, wherein said pre-load applying means biases said ball bearings to move away from each other in the axial direction thereof.

7. A coupling mechanism for a rotary fluid cylinder which comprises a rotary member; a fluid feeding member concentrically mounted on said rotary member; and at least one fluid passage means for supplying fluid from said fluid feeding member to said rotary member even while said rotary member is rotating, said coupling mechanism comprising:

a pair of rolling bearings interposed between said fluid feeding member and said rotary member at respective extreme end portions of said fluid feeding member so as to allow relative rotation of said rotary member with respect to said fluid feeding member, said rolling bearings each having an outer ring; and means for applying a predetermined pre-load to said respective rolling bearings in such a manner that said rolling bearings are biased so as to move away from each other, said pre-load being applied to said outer ring of said respective rolling bearings.

8. The coupling mechanism of claim 7, wherein said fluid feeding member has an inner surface portion, and said pre-load applying means comprises an elastic member arranged between side surfaces of said outer rings and inner surface portions of said fluid feeding member.

9. The coupling mechanism of claim 8, wherein said pre-load applying means comprises a pair of elastic members respectively arranged between a side surface of a respective outer ring and an inner surface portion of said fluid feeding member.

10. The coupling mechanism of claim 9, wherein said elastic members comprises resilient spring members.

11. The coupling mechanism of claim 7, wherein said rolling bearings each comprise a deep-groove rolling bearing.

12. The coupling mechanism of claim 7, wherein said pre-load applying means biases said rolling bearings to move away from each other in the axial direction thereof.

* * * * *